United States Patent [19]

Conway

[11] Patent Number: 5,256,434
[45] Date of Patent: Oct. 26, 1993

[54] METHOD OF PROCESSING LIVE CRABS

[75] Inventor: Terrence N. Conway, Salisbury, Md.

[73] Assignee: Taiyo Oil Company, Ltd., Tokyo, Japan

[21] Appl. No.: 735,818

[22] Filed: Jul. 25, 1991

[51] Int. Cl.⁵ .................. A23B 4/00; B65B 55/00
[52] U.S. Cl. ............................. 426/393; 62/63; 62/64; 426/129; 426/383; 426/396; 426/479; 426/524
[58] Field of Search .............. 426/479, 119, 129, 393, 426/396, 524, 643, 383, 87; 53/440; 62/62, 63, 64, 373

[56] References Cited

U.S. PATENT DOCUMENTS

| | | | |
|---|---|---|---|
| D. 221,624 | 8/1971 | Kremkau | D9/192 |
| D. 222,436 | 10/1971 | Kremkau | D9/192 |
| D. 222,437 | 10/1971 | Kremkau | D9/193 |
| 1,540,887 | 6/1925 | Hunley | 426/129 |
| 2,155,308 | 4/1939 | Harris | 426/479 |
| 2,176,764 | 10/1939 | Gross | 426/129 |
| 2,292,068 | 8/1942 | Grayson | 209/620 |
| 2,582,007 | 1/1952 | Christiansen | 209/666 |
| 2,776,215 | 1/1957 | Thomas | 426/396 |
| 2,776,216 | 1/1957 | Thomas | 426/396 |
| 2,909,040 | 10/1959 | Newell | 426/524 |
| 2,920,968 | 1/1960 | Grandy | 426/129 |
| 3,006,774 | 10/1961 | Zebarth | 426/393 |
| 3,048,989 | 8/1962 | Morrison | 426/64 |
| 3,085,884 | 4/1963 | Morrison | 426/393 |
| 3,099,567 | 7/1963 | Wallace et al. | 426/129 |
| 3,104,977 | 9/1963 | Morrison | 426/393 |
| 3,138,935 | 6/1964 | Morrison | 62/64 |
| 3,152,915 | 10/1964 | Cover et al. | 426/393 |
| 3,298,158 | 1/1967 | Schmidt | 426/396 |
| 3,368,366 | 2/1968 | Keeling | 62/64 |
| 3,404,989 | 10/1968 | Hirtensteiner | 426/393 |
| 3,461,680 | 8/1969 | Rische | 426/524 |
| 3,488,913 | 1/1970 | Burgess | 53/442 |
| 3,508,930 | 4/1970 | Bennett et al. | 426/119 |
| 3,682,365 | 8/1972 | Reifers et al. | 426/129 |
| 3,739,544 | 6/1973 | Hanemann | 53/442 |
| 3,770,123 | 11/1973 | Mraz | 209/668 |
| 3,780,196 | 12/1973 | Domecki | 426/393 |
| 3,834,606 | 9/1974 | Andersson | 426/129 |
| 3,989,154 | 11/1976 | Walklet | 206/507 |
| 3,997,057 | 12/1976 | Craig | 206/507 |
| 4,171,747 | 10/1979 | Metzger et al. | 209/658 |
| 4,230,729 | 10/1980 | Hoelzel, Jr. | 426/129 |
| 4,309,449 | 1/1982 | O'Roark et al. | 426/643 |
| 4,336,274 | 6/1982 | Ross et al. | 426/643 |
| 4,522,301 | 6/1985 | Ajmera | 426/119 |
| 4,611,456 | 9/1986 | Gillio-tos et al. | 53/427 |
| 4,692,341 | 9/1987 | Ikeuchi et al. | 426/643 |
| 4,728,521 | 3/1988 | Mitchell | 426/119 |
| 4,888,956 | 12/1989 | le Roux Murray | 62/64 |
| 4,934,537 | 6/1990 | DeBourke | 209/657 |
| 4,958,480 | 9/1990 | Warner | 426/129 |

OTHER PUBLICATIONS

Strasser et al., "Blue Crab Meat Preservation by Freezing", presented at the 30th Annual Meeting of the Institute of Food Technologists, May 24–28, 1970 (pp. 1–12).

Primary Examiner—George Yeung
Attorney, Agent, or Firm—William E. Mouzavires

[57] ABSTRACT

A method, system and apparatus are disclosed for sorting, cryogenically freezing and wrapping soft-shelled blue crabs.

18 Claims, 4 Drawing Sheets

METHOD OF PROCESSING LIVE CRABS

BACKGROUND OF THE INVENTION

The present invention relates generally to food processing and, more particularly, to an improved method, system and apparatus for processing whole crabs, especially soft-shelled crabs.

Crabs are an extremely popular form of seafood. As with many seafoods, preserving their natural taste is a desireable end, which many food processors seek to obtain. Heretofore, a variety of approaches have been used for processing crabs; regardless of species and whether or not they are so-called hard- and/or soft-shelled. For background purposes, the terms "hard-shell" and "soft-shell" as applied to crabs do not refer to particular species, rather, these terms relate to specific portions of a crab's life-cycle. Blue crabs (i.e. *Callenectes Sapidus*) are called soft-shelled when they have recently molted and hard-shelled when the shell is fully formed.

For a number of reasons, processing crabs is a delicate procedure. For instance, crab meat quickly deteriorates following the crab's death. Thus, expediency in preserving crab meat is important for health and taste considerations among others. Moreover, if the crab meat is processed incorrectly, there is a distinct likelihood that the crab meat's fine texture and taste would be unfavorably compromised. Furthermore, crabs are fragile and care must be undertaken to avoid fracturing them or otherwise having the body parts separate not only during processing, but during packaging and shipping as well.

In processing crabs, it is common for such crabs to be transported from a crabber or wholesaler to a processor before being treated. Treatment generally involves cooking or boiling the crabs before freezing them. Some attempts to preserve crabs include the steps of precooking a whole blue crab, for instance, followed by a quick freezing thereof; as described in U.S. Pat. No. 4,336,274. In this patented approach, the whole crab is initially pre-cooked in a sugar water solution and then quick-frozen to temperatures lower than −15° F. by immersion in a Freon TM bath. Another approach that is described in the prior art is a combined pre-cooking step along with a cryogenic freezing step. Still another approach for preserving whole crabs is described in U.S. Pat. No. 4,309,449, in which, for instance, whole blue crabs are chilled initially, followed by placing them in a brine solution which contains chemicals and is maintained at a temperature of from about −7° F. to 10° F. These approaches which utilize quick-freezing refrigerants, however, also use a cooking step preliminary to the freezing for purposes including better preserving of crab meat texture and flavor. Still another approach for preserving whole crabs includes a process whereby fresh crabs, as opposed to live crabs, are individually wrapped in plastic wrappers soon after their death and are then frozen in a conventional blast freezer over a 4 to 8 hour period. For background information, fresh crabs are generally understood to mean crabs which have been killed and have parts thereof, such as the apron, lungs and face removed. Thereafter, the frozen crabs are wrapped, packaged and shipped. This latter approach is somewhat labor intensive and, of course, involves considerable time for freezing the crabs to the desired temperature.

From the foregoing description, it is clear that there is an ongoing effort in the crab processing industry to quickly and safely process and preserve crabs, especially blue crabs. It is also an ongoing interest in this field to improve upon the manner by which fresh crabs are packaged and shipped, such that the number of crabs lost through spoilage in processing, transit or storage are diminished significantly.

SUMMARY OF THE INVENTION

In accordance with the present invention, there are provided an improved method, system and apparatus for processing crabs which represent substantial improvements over heretofore known procedures.

According to one aspect of the present invention, there is provided an improved method of processing crabs comprising the steps of removing a portion of the crab, cryogenically freezing the crab immediately following removal of said portion. In this latter illustrated embodiment, the freezing step includes the cryogenic freezing of soft-shelled blue crabs.

In another illustrated embodiment, the soft-shelled blue crabs have their cores frozen to a temperature within a range of about −10° F. to 15°F. In this illustrated embodiment, the cryogenic freezing step is achieved by spraying a cryogenic refrigerant, such as liquid nitrogen onto a soft-shelled crab's exposed belly.

In another aspect of the present invention, there is provided a crab tray for use in supporting the crabs during processing, packaging and shipping of the same. In one illustrated embodiment, the crab tray includes a generally planar supporting body having at least one depression formed therein. Preferably, the depression is sized and shaped to be substantially complementary to the shape of a blue crab's shell including folded claws and legs. In this manner, the crab's shell and claws are snugly retained by the depression and the crab's belly and claws are facing upwardly, whereby crab meat can be easily visually inspected.

In another illustrated embodiment, the tray body is made of a lightweight plastic material for use in shipping which material is biocompatible to the crab and resists cracking during cryogenic freezing. Also in this embodiment, each tray is provided with indicia, preferably color-coding, for indicating the size of a particular depression, whereby a person sorting the crabs can easily sort the desired sized crab for a particular size tray.

In another illustrated embodiment, there is provided a crab wrapping approach which follows freezing, wherein the wrapping of the crabs on a deformable tray is achieved by vacuum wrapping a transparent plastic wrap over the tray carried crabs. In this illustrated embodiment, a carrier or magazine is provided with recesses to firmly retain the crab-filled trays during vacuum wrapping and prevent deformation of the tray.

In another illustrated embodiment of the present invention there is provided a system for preserving live and/or fresh crabs comprising: a mechanism for defining a freezing chamber for the crabs; and means for introducing cryogenic refrigerant into the chamber so as to cryogenically freeze the crabs. In such embodiment, the freezing chamber includes inlet and outlet openings for allowing travel of the crabs through the freezing chamber and means are provided for conveying the crabs through the freezing chamber at a rate which insures freezing. The device for introducing cryogenic refrigerant includes means for applying the cryogenic refrigerant onto a crab's belly by spraying liquid nitrogen.

In another illustrated embodiment, the system includes a vacuum wrapping apparatus which vacuum packs a plastic sheet over the deformable crab-filled trays, wherein a carrier or magazine is provided in the apparatus and has recesses so as to receive the tray and prevent undesired tray movement and deformation of a deformable crab tray during the vacuum packing.

Still another aspect of the present invention includes a method of processing crabs, wherein live crabs are placed onto an input end of a moving conveyor; the crabs are sorted manually according to predetermined sizes; crabs of predetermined size are removed from the conveyor and each crab's has undesired parts removed; each crab is mounted on a color-coded tray having preformed depressions so that the crab's belly and claws are facing upwardly and are exposed when subsequently wrapped, wherein the depressions are substantially complementary to anatomical features of the crab's shell and claws of, preferably, a Chesapeake Bay blue crab; freeze preserving the crabs by passing the crab-filled trays through a cryogenic tunnel wherein the exposed crab belly are subjected to a sprayed cryogenic refrigerant such as liquid nitrogen; glazing the crabs upon exiting the cryogenic tunnel; and placing the trays carrying the crabs into a carrier or magazine which has shaped recesses complementary to the trays for receiving the trays in such a manner that the trays will not deform and break on the crab when subjected to vacuum wrapping of the crabs on the tray.

It is an object of the present invention to make provision for an improved method of preserving whole live crabs by cryogenically freezing them; the provision of an improved method of processing fresh crabs by cryogenically freezing them without any intervening cooking; the provision of an improved method of the last noted type wherein the crabs frozen are blue crabs having soft-shells; the provision of an improved method of the last noted type wherein the cryogenic freezing is achieved by spraying a cryogenic refrigerant, such as liquid nitrogen onto the crab's belly; the provision of an improved method of sorting crabs by utilizing color-coded crab sorting trays which receive predetermined sized crabs therein; the provision of an improved method of freeze preserving crabs by placing them in trays which orient the exposed crab meat during the freezing process thereby ensuring uniformity of freezing and easy visual inspection thereof; the provision of an improved sorting tray and method of the foregoing type wherein the sorting tray has depressions which are substantially complementary to at least the shell of a soft-shell blue crab so as to firmly retain the crabs in the tray during processing, packing and shipping; the provision of an improved vacuum wrapping apparatus for and method of wrapping crab-filled trays which utilize carriers or magazines which are structured and sized to receive the trays including their depression so as to prevent the trays from being deformed, during a vacuum wrapping procedure about the crab.

These and other objects and further scope of applicability of the present invention will become apparent from the detailed description to follow when taken in conjunction with the accompanying drawings wherein like parts are designated by like reference numerals throughout the several views.

DETAILED DESCRIPTION

Reference is made to FIGS. 1-6 of the drawings for illustrating one preferred embodiment of the improved method, system and apparatus of the present invention. The preferred embodiment is directed to an extremely expeditious manner of processing whole crabs; especially blue crabs (*Callinectes Sapidus*) of the soft-shelled type, such as from the Chesapeake Bay. The whole crabs 10 are obtained from a crabber or wholesaler, while the latter are still alive. Live whole crabs 10 of different sizes are placed onto one end of a moving endless belt type conveyor assembly 12 or other suitable conveyor. As the crabs 10 move along the conveyor 12, a plurality of workers 14 are positioned at individual work stations which are spaced along the longitudinal extent of the path of crab movement, indicated by arrow A. The workers 14 serve to sort the crabs according to various predetermined sizes, as well as dress the crabs by removing undesirable crab parts, such as the apron, head and lungs (not shown). The soft-shelled crab industry recognizes predetermined names for different sizes of blue crabs, such as so-called Prime, Jumbo, Whale, Hotel and Medium. Each worker is generally assigned to sorting and dressing one particular size of crab which includes removing the undesired parts thereof. As noted, this embodiment is concerned with processing these fresh soft-shelled crabs as opposed to live crabs. As will be understood, however, the present invention also envisions within its scope that the subsequent freezing step can be applied to live crabs, preferably of the soft-shelled type.

Figure 3:
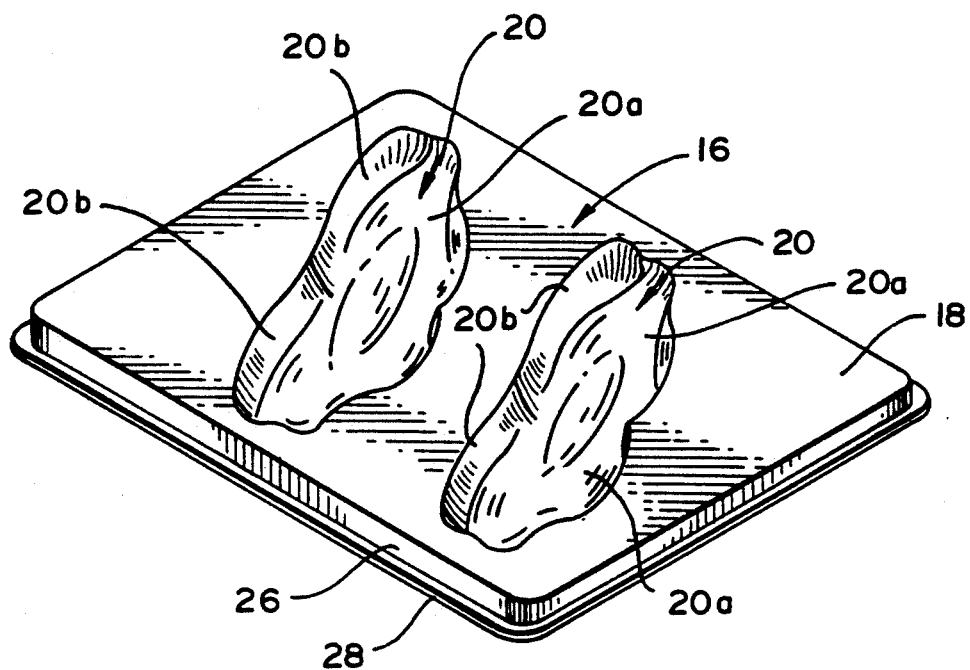
FIG. 3 is a perspective view of a coded tray according to the invention.
Figure 4:
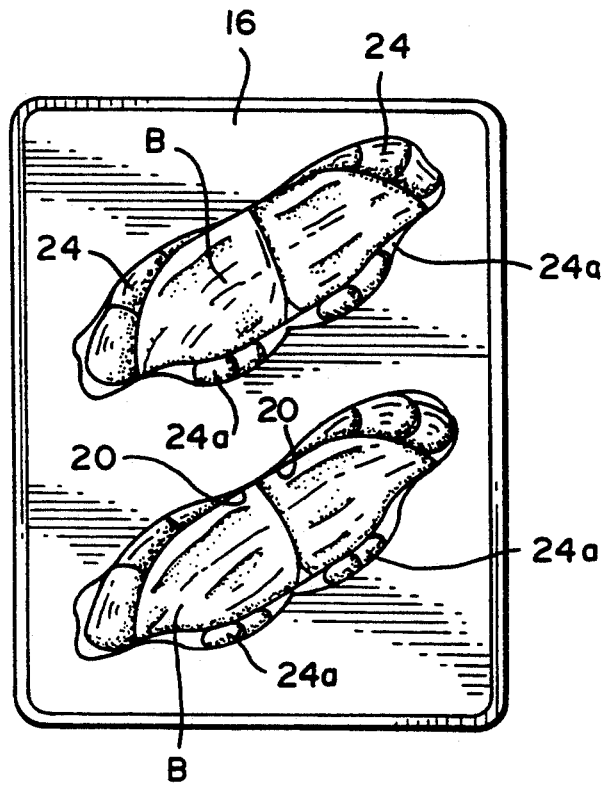
FIG. 4 is a plan view of the tray of FIG. 3 but with a crabs packed therein.

According to one aspect of the present invention there is provided a crab sorting and storage tray 16, such as shown in FIGS. 3-4. The sorting tray 16 is comprised of a thin sheet (e.g. 0.0220 mil) of integral molded high density polyethylene plastic composition which is constructed to be lightweight, thereby facilitating low cost shipping of the tray and the crabs contained thereon. While the tray 16 is relatively thin, lightweight and is deformable it is nevertheless sufficiently rigid to support the crab during processing, packing and shipping. In this embodiment, the tray 16 has a generally planar body portion 18, preferably, having a plurality of depressions 20 molded integrally therein. The depressions 20 each have a predetermined size and shape. The shape is specifically adapted to receive therein, in a closely held manner, the crab including the carapace or shell 22 (FIG. 1) of the soft-shelled blue crab 10 together with portions of folded crab claws 24 and legs 24a, such as best shown in FIG. 4. The size of the depressions 20 is adapted to, preferably, hold one of the noted sizes of soft-shelled crabs. The depressions each include a shell receiving portion 20a as well as claw receiving portions 20b. Specifically, the depressions 20 are formed by molding the shell receiving portion 20a to be substantially complementary to the configuration of the carapace or shell of the Chesapeake Bay blue crab and the depressions, preferably, also have the claw receiving portions 20b formed to receive claws folded adjacent the crab's body. In this fashion, the crab's belly B is exposed and facing upwardly so as to expose the crab meat thereof for not only the visual inspection to follow, but also for the cryogenic freezing preservation which is part of the present invention. Because each of the crabs has a very close fit in the depressions 20, the former are thereby securely held for subsequent processing, wrapping, shipping and storage steps so as to minimize damage to the crab. The tray 16 has marginal edge portion 26 with a marginal flange 28. It should be pointed out that the tray 16 can have other configurations and be made from other materials so long as the depressions serve to snugly retain the crabs therein. Referring back to the construction of the tray 16, it is, as noted, made from a high density polyethylene plastic composition. The material also has a component (e.g. kraton) therein which is able to resist cracking of the plastic when the latter is subjected to cryogenic freezing temperatures, such as about $-150°$ F. to $15°$ F. The tray material is also biocompatible with crab. According to this invention, the tray 16 can be made from other materials consistent with the principles of the present invention. Also the tray can be formed so that the depressions receive the crab's belly.

Another aspect of the invention is that, preferably, the entire tray is color coded to indicate a specific size crab which is to be placed therein. Each of the above noted crab sizes is represented by a separate color. Other types of indicia can, of course, be used to differentiate visually the different crab sizes. However, color coding facilitates a much easier visual identification of the size of crab which is sorted for packaging and shipping purposes. Moreover, the number of depressions in each tray is a factor of a dozen. For example, the tray 16 includes two depressions 20. This is done because crabs are commercially sold by the dozen and it is, therefore, easier for workers to count dozens when the crabs carried by the tray 16 are packaged in factors of a dozen. Moreover, the trays 16 serve to reduce spoilage by significantly reducing the likelihood of the crabs being fractured or the body parts being separated during the processing.

Figure 1:
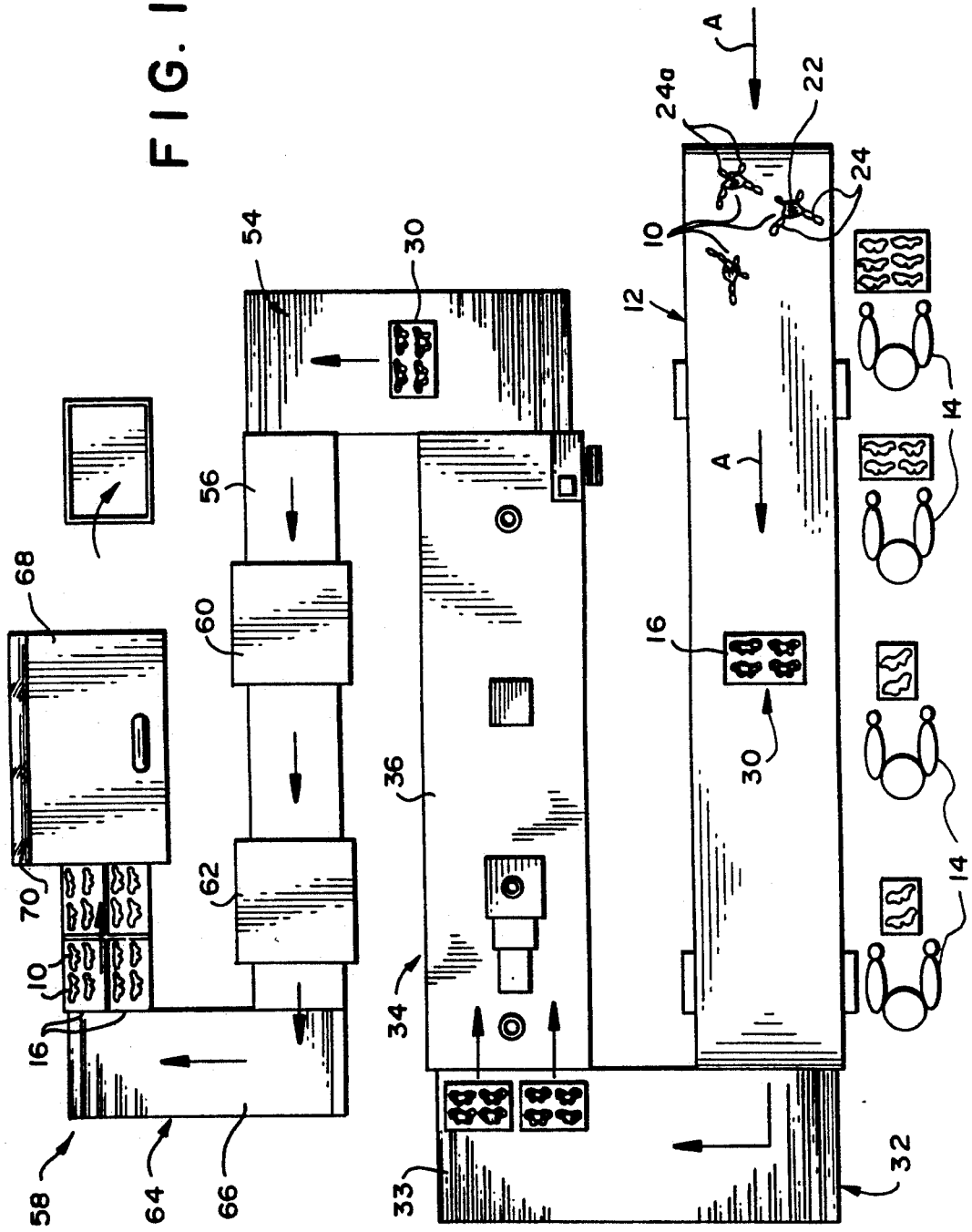
FIG. 1 is a schematic plan view of an improved crab processing system according to the present invention.
Figure 2:
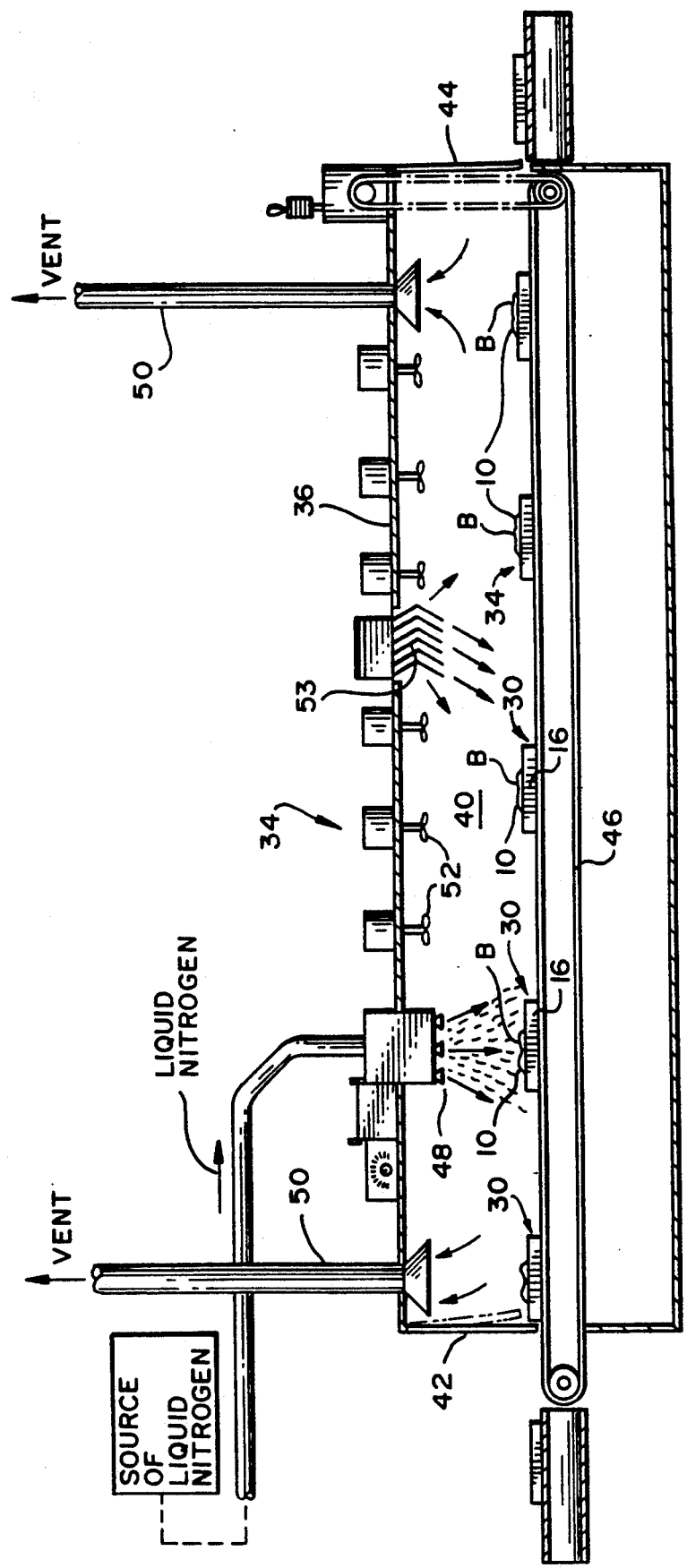
FIG. 2 is an elevational view in cross-section illustrating an improved freezing system of the present invention.

Reference is made back to FIGS. 1 and 2 for illustrating the process of processing the fresh crabs 10 through the cryogenic freezing thereof. After sorting the crabs by size, a worker 14 places crab-filled trays 30 on the moving belt conveyor 12 and they are transported to a tray collection station 32 which includes a non-moving roller type conveyor 33. The trays 16 are allowed to accumulate at the station 32 for subsequent cryogenic freezing. At this station, the trays 16 are assembled into rows and columns for introduction into the cryogenic freezing apparatus 34.

Reference is made to FIGS. 1 and 2 for illustrating the cryogenic freezing apparatus 34 of this invention. As seen it includes an elongated tunnel assembly 36 comprising a housing assembly 38 defining an elongated freezing chamber 40 having an inlet opening 42 and an outlet opening 44. A moving belt type conveyor 46 is arranged to travel through the tunnel assembly 36 as well as the openings 42, 44 for carrying the crab-filled trays 30. The conveyor 46 can have its speed controlled through a suitable variable speed conveyor mechanism (not shown) so that the crab-filled trays 30 can travel along their path (FIG. 2) at different speeds. The speeds are selected in relationship to the temperatures in the chamber 40 so as to insure that fresh crabs are frozen to the desired temperatures which will be discussed. The tunnel 30 is suitably insulated for use with a cryogenic refrigerant that effects the cryogenic freezing.

In the preferred embodiment, the cryogenic refrigerant is liquid nitrogen. While liquid nitrogen is the preferred refrigerant, it will be understood that this invention contemplates other suitable refrigerants. However, liquid nitrogen is non-toxic and rapidly effects the desired degree of freezing. The liquid nitrogen is introduced onto the crabs by virtue of spray nozzles 48 that are situated adjacent the inlet opening 42. Because the crab bellys B are facing upwardly the liquid nitrogen directly contacts the crab meat. Such direct contact minimizes the amount of refrigerant which must be utilized for effecting the rapid freezing as well as the time to reach the desired degree of freezing. Also, the trays 16 assist in preventing the crabs from being physically jostled so as to avoid cracking or separating which might otherwise occur during unprotected travel through a cryogenic freezing chamber 40. In addition, the crabs 10 are frozen to a temperature and in a time which while insuring freezing, also avoids cracking of the crabs. The liquid nitrogen is introduced into the freezing chamber 40 at a temperature so that the chamber is kept at about $-50°$ F. during processing of this embodiment. A venting arrangement 50 is positioned adjacent the inlet and outlet openings, as shown in the drawings, so as to vent the vaporized liquid nitrogen. The tunnel 36 is additionally provided with fans 52 and a suitable baffle 53 which are arranged and operated so as to provide the desired circulation of the gases which are present, thereby providing for a certain amount of uniformity of temperature throughout the chamber 40.

Because the liquid nitrogen has been applied to the crabs the desired freezing is achieved in a very short period of time, for example, 20 minutes. Also, while this embodiment has described that the crabs are cryogenically frozen while being on a moving conveyor it will be appreciated that the crabs can be batch frozen if desired. Moreover, the invention envisions that live crabs can be cryogenically frozen while they are on board a vessel assuming, of course, the vessel is provided with suitable cryogenic freezing equipment of the type noted. While, it is desired to have the crabs quickly frozen to temperatures such that they are, preferably, at about $-10°$ F. to $15°$ F., other temperatures are envisioned consistent with the principles of the present invention. For instance, in the illustrated embodiment, it is preferred to have the crab belly B frozen to a temperature of about $0°$ F. when exiting the chamber 40. Accordingly, the conveyor belt speed and the temperature in the chamber 40 are selected to provide the desired degree of freezing in the chamber. It has been determined that crabs 10 which have been frozen to the noted range of temperatures provide a particularly high quality crab meat which retains its natural crab flavor and texture. The reduced amount of time spent for freezing the crabs represents a significant advantage over other known approaches.

Upon exiting the chamber 40, the crab-filled trays 30 are conveyed manually on a roller conveyor 54 to a moving belt conveyor 56 which transports them to a crab package wrapping station 58. However, before the crabs reach this destination they are conveyed through a known type of glazing station 60. At the glazing station 60 a plurality of water nozzles (not shown) are positioned on support members and operate to direct the spray of water over the moving belt conveyor 56 and onto the emergent frozen crabs on the tray. The spray is, preferably, of purified water and a thin coating of ice is formed over the cryogenically frozen crabs. The thin coating of ice assists in the prevention of dehydration of the crabs as well as assists in the prevention of their breakage during subsequent processing and shipping. After passing through the glazing station 60, the crab-filled trays 30 pass through an air-knife device 62. The air knife device 62 is conventional and is operable to blow air on the crabs and the trays so as to remove excess water; thereby controlling the degree of glazing. The conveyor 56 moves the trays 30 toward a tray receiving area 64 which may include roller conveyors 66, whereby a worker can manually advance them to a vacuum packing apparatus 68. The crab-filled trays 30 are to be vacuum wrapped by a known vacuum packing machine 68.

Figure 5:
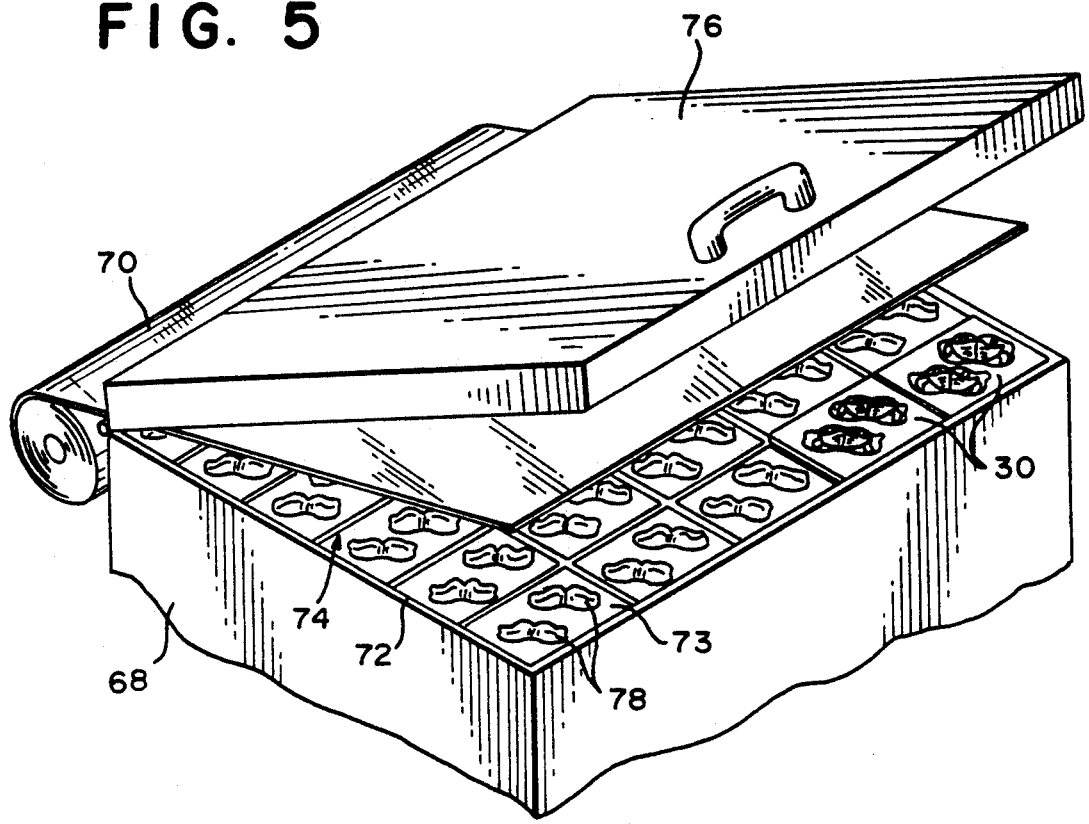
FIG. 5 is a perspective view of an improved vacuum packing apparatus system of the present invention.
Figure 6:
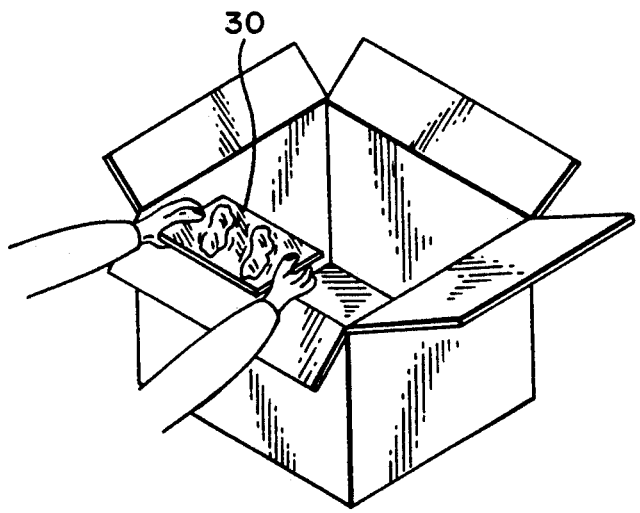
FIG. 6 is a perspective of the wrapped tray being packaged for shipping.

As seen in FIG. 5, a known transparent semi-permeable plastic, vacuum wrappable, wrapping skin film or sheet 70 is mounted on a roll 71 that is attached to the vacuum packing machine 68. The machine 68 can be of several known types. In this embodiment, it is known as a Trygon vacuum packing machine which is commercially available from Koch Supply Co. of Kansas. Obviously, other types of sheet wrapping materials are contemplated. The plastic wrapping skin film or sheet 70 includes a heat releasable adhesive which will serve to better adhere the sheet onto the edge 28 of the tray 16 so as to provide a seal. While vacuum wrapping is disclosed, this invention envisions that other approaches can be applied or, in fact, none at all. However, vacuum packing is desired because it restrains undesired movement for the fragile crab so as to facilitate subsequent crab packing and shipping. Referring to the vacuum packing machine 68, it includes a tray receiver portion 72 defining a crab tray receiving well 73 for receiving a tray magazine 74 and the trays 16. A closeable lid 76 is provided on the machine which is movable between open and closed positions. Details of the machine's construction and operation are not necessary since they are known. However, only that structure and those functions necessary for understanding the present invention will be described. Other vacuum wrapping and packing machines are contemplated.

Prior to placing the crab-filled trays 30 into the wrapping machines 68, they are placed onto the tray carrier or magazine 74. The magazine 74 restrains unwanted tray movement during wrapping. Such restraint is desired since it tends to minimize damage to the fragile crabs. In this embodiment, the tray magazine 74 is a generally rectangular unit made of high density Mylar TM and is removable, as a unit, from within the well 73. The magazine 74 has depressions 78 molded therein. The depressions 78 are constructed to snugly receive therein, in nested relationship, the configurations of the tray 16 including the depressions 20 and the tray's flange. During the vacuum packing step, the plastic wrapping skin or sheet 70 is drawn over the crabs on the tray. When the lid 76 is closed a suitable mechanism in the machine 68 is operable to draw a vacuum in the well 73 and heat is generated so as to cause the skin film to adhere to the tray in a known manner. The magazine 74 prevents the wrapping sheet 70 during vacuum wrapping from otherwise deforming the thin plastic tray 16 and damaging the crabs. Since there are different sized and configured trays, there are correspondingly different magazines therefor. While the magazine 74 is seen as integral it can be comprised of several components. Because of the vacuum application step, the sheet 66 is tightly wrapped over the crab-filled trays. Subsequently, after opening the lid, an operator can release each wrapper crab-filled tray 30 from the magazine 74 by cutting the plastic about the marginal edges of the tray. Thereafter, the vacuum wrapped trays can be placed into suitably sized packages for subsequent storage and shipping and storage.

After having described the embodiment of the present invention, the operation of this invention is believed to be self-evident.

According to the present invention it will be recognized that certain changes may be made in the above-described method, system and apparatus for processing fresh crabs without departing from the scope of the present invention herein involved. It is intended that all matter contained in this description and shown in the accompanying drawings shall be interpreted as illustrative and not in any limiting sense.

What is claimed is:

1. A method of vacuum packing live or fresh crab mounted on a deformable crab holding tray having a depression for receiving each crab, said method comprising the steps of:

providing a magazine assembly having recesses formed therein which receive and firmly support the deformable tray including the depression;

placing the assembly in a vacuum chamber whereby during vacuum wrapping the tray is restrained by the magazine against unwanted movement which would otherwise cause the tray to deform and thereby damage the fragile crab and/or the deformable tray;

placing a flexible sheet material over the crab and tray; and, applying at least a vacuum so that the sheet is wrapped tightly over the crab and tray.

2. A method of processing live or fresh soft-shelled crabs comprising the steps of:

sorting the crabs by size;

placing the sorted crabs in trays;

cryogenic freezing of the sorted crabs in the trays to a temperature between $-10°$ F. to $15°$ F. and without any intervening cooking step; and wrapping the frozen crabs in a sheet material by tightly wrapping the sheet material over the trays and crabs.

3. The method of claim 2 wherein:

said sorting step includes using a plurality of sorting trays, each having at least a depression of a predetermined size for snugly receiving and supporting a predetermined sized crab and the trays being visually coded to represent different sized crabs so as to be easily identified for sorting and packing.

4. The method of claim 3 wherein said sorting step utilizes color-coded trays, wherein different colors represent different predetermined sized depressions for crabs.

5. The method of claim 3 wherein said sorting step includes using trays wherein the depressions are each configured to substantially be complementary to the crab's shell and folded claws so as to snugly receive and support therein the shell and folded crab claws so that the crab belly is exposed.

6. The method defined in claim 2 further including the steps of using a plurality of sorting trays for receiving and supporting a predetermined-size crab, and vacuum wrapping the sheet material over the crab on the tray, and wherein the wrapping step includes placing each of the trays in a magazine having recesses for snugly receiving the trays to restrain unwanted tray movement and to prevent deformation of a deformable tray during vacuum wrapping.

7. The method defined in claim 6 wherein the cryogenic freezing step includes applying cryogenic refrigerant on to the crab's belly so as to freeze it.

8. A method of processing live or fresh soft-shelled crabs comprising the steps of:
sorting the crabs by size; and
freezing the sorted crabs without any intervening cooking step;
said sorting step includes using sorting trays, each having at least a depression of a predetermined size for receiving a separate crab, and the trays being visually coded to represent different sizes of crabs so as to be easily identified by sorters and packers, and wherein said depression is configured to snugly receive therein a crab's shell and folded crab claws so that the crab belly is exposed; and
said freezing step includes applying a cryogenic refrigerant onto the crab's belly.

9. The method of claim 8 wherein said sorting step utilizes color-coded trays, wherein different colors represent different sized crabs.

10. The method of claim 8 wherein said cryogenic step includes applying the cryogenic refrigerant onto the crab's belly so as to freeze it wherein the cryogenic refrigerant utilized is liquid nitrogen.

11. The method of claim 10 wherein the cryogenic refrigerant freezes the crab to about between $-10°$ F. to $15°$ F.

12. The method of claim 8 further including wrapping the crab on the tray in a sheet material, wherein said wrapping step includes vacuum wrapping a sheet material over the crab on the tray, wherein said wrapping step includes placing each trays in a magazine having recesses for snugly receiving the tray so as to restrain unwanted tray movement and to prevent deformation of a deformable tray during vacuum wrapping.

13. The method defined in claim 11 further including wrapping the crab on the tray in a sheet material, wherein said wrapping step includes vacuum wrapping a sheet material over the crab on the tray, wherein said wrapping step includes placing each of the trays in a magazine having recesses for snugly receiving the tray so as to restrain unwanted tray movement and to prevent deformation of a deformable tray during vacuum wrapping.

14. A method of vacuum packing live or fresh crabs comprising the steps of:
placing the crabs in trays;
placing the trays in a magazine for supporting the trays;
placing the magazine in a vacuum chamber; and
placing a flexible sheet material over the crab and tray while in the vacuum chamber, and applying a vacuum in the vacuum chamber so that the flexible sheet is wrapped tightly over the crab and tray.

15. A method of processing fresh soft-shelled crabs comprising the steps of:
placing the crabs on a moving conveyor and manually sorting the crabs according to size;
removing crabs of predetermined size from the conveyor and removing undesired parts from the crabs;
mounting the sorted crabs in color coded trays according to size and with the crab's belly and claws facing upwardly to be exposed;
passing the crab filled trays through a refrigerant station during which cryogenic refrigerant is sprayed onto the bellies of the crabs; and
wrapping sheet material over the crabs and trays.

16. The method defined in claim 15 further including the step of spraying water over the frozen crabs to glaze the crabs with a thin coating of ice.

17. The method defined in claim 16 including the step of employing trays with depressions in the trays shaped to snugly receive the crabs.

18. The method defined in claim 15 including the step of employing trays with depressions in the trays shaped to snugly receive the crabs.

* * * * *